United States Patent [19]
Painley et al.

[11] 3,731,534
[45] May 8, 1973

[54] HOUSING STRUCTURE FOR METERS

[75] Inventors: Elmer F. Painley; Bernard Last, both of Uniontown; Joseph B. Dym, Pittsburgh, all of Pa.

[73] Assignee: Rockwell Manufacturing Company, Pittsburgh, Pa.

[22] Filed: Nov. 18, 1970

[21] Appl. No.: 90,684

[52] U.S. Cl. ..................73/273, 73/277, 73/431
[51] Int. Cl. .....................G01f 15/10, G01f 15/14
[58] Field of Search ............73/194 R, 198, 201, 73/204, 229–261, 272, 273, 277; 138/32, 33, 100, 106; 239/63, 64, 65, 71, 74; 15/250.1, 250.15, 250.22

[56] References Cited

UNITED STATES PATENTS

| 3,443,436 | 5/1969 | Meyer | 73/273 |
| 3,079,089 | 2/1963 | Tomayer | 239/63 |
| 3,212,339 | 10/1965 | Olmedo | 73/431 |
| 3,355,945 | 12/1967 | Perry | 73/201 |

FOREIGN PATENTS OR APPLICATIONS

| 714,217 | 8/1954 | Great Britain | 73/273 |

Primary Examiner—Richard C. Queisser
Assistant Examiner—C. E. Snee, III
Attorney—Strauch, Nolan, Neale, Nies & Kurz

[57] ABSTRACT

A structure for housing a meter and comprising a hollow body having an open end for receiving the meter and a housing top that is detachably screwed on the body to cover the open top and define an enclosure for the meter. The housing top has a window for viewing the reading on a register of the meter, and the housing top is rotatable on the housing to cooperate with a stationary wiper for wiping the interior face of the register-viewing window clear of condensation or moisture. A special tamperproof arrangement interlocking the body and housing top permits limited rotation of the housing top to wipe the register-viewing view, but requires the breaking of a wire and lead seal or other part to detach the housing top from the body.

19 Claims, 10 Drawing Figures

PATENTED MAY 8 1973 3,731,534

INVENTORS
ELMER F. PAINLEY
BERNARD LAST
JOSEPH B. DYM

BY
Strauch Nolan Neale Nies + Kurz
ATTORNEYS

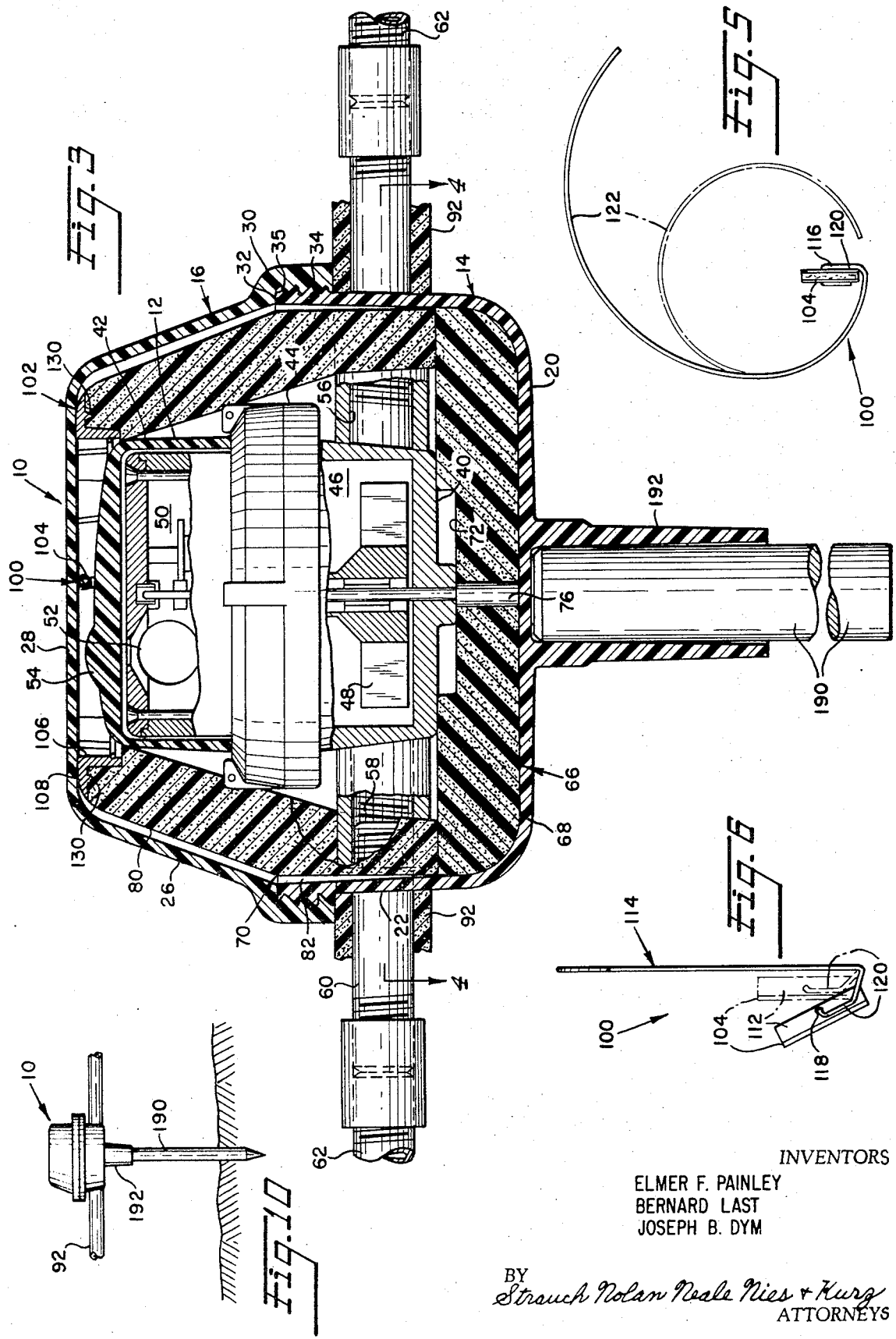

HOUSING STRUCTURE FOR METERS

FIELD OF INVENTION

This invention relates to enclosures for housing fluid flow meters and the like.

BACKGROUND

Prior to this invention thermally insulated housings or boxes have been proposed for enclosing water or other liquid meters to protect the meter from freezing and other ambient conditions. One meter enclosure of this type is described in U.S. Letters Pat. No. 3,443,436 issued to L.S. Meyer on May 13, 1969 for Meter Housing Structure.

Meter housing structures of the type described in the above-mentioned patent have a number of shortcomings. First, these structures are customarily provided with covers or the like that must be lifted or removed in order to observe the reading on the meter register. In addition to being inconvenient, it will be appreciated that such a structural characteristic is incompatible with a tamperproof enclosure in which one or more parts must be destroyed in order to gain access to the enclosed meter.

SUMMARY AND OBJECTS OF INVENTION

A major object of this invention is to provide for a novel meter-enclosing housing which is of simplified tamperproof construction in that it requires destruction of one or more parts to gain access to the enclosed meter, which permits the meter register to be read conveniently through a window, and which enables the window to be interiorly wiped to remove moisture and other matter for clearly viewing the meter register.

According to this invention, the housing comprises a cup-shaped part for receiving the meter and a transparent dome screwed on to the cup-shaped part to enable the meter register to be read without disassembling the component parts of the housing. A special arrangement interlocking these housing parts necessitates the breaking of a wire and lead seal or other part of the housing assembly in order to gain access to the enclosed meter.

With the foregoing housing construction condensation or moisture unavoidably accumulates on the register-viewing window portion of the screw-on dome under certain conditions to impair observation of the meter register. This problem is overcome by the above-mentioned special locking arrangement and a cooperating stationary wiper that engages the interior face of the register-viewing window portion of the screw-on dome. The special locking arrangement is constructed to enable the dome to selectively be rotated through a limited angle short of detachment from the cup-shaped housing part and without destroying the wire and lead seal or any other part of the housing assembly. The angle of limited, non-access rotation, however, is sufficiently large to enable the register-viewing window portion to be wiped clean by the stationary wiper.

Many window wiping arrangements have been proposed in the past (See for example, U.S. Letters Pat. Nos. 2,627,242 and 2,047,118), but as compared to the construction of this invention, they are expensive to manufacture and are unsuitable for use with the screw-on type dome mentioned above.

According to a further object of this invention, the stationary wiper of this invention is supported on an internal thermal insulation liner that fits around the meter in the housing. This liner also confines the meter against appreciable movement in the housing. The housing and the liner furthermore are constructed to enable pipe line type heating elements (such as electrical wrap around heating cable) to be extended through the housing and along the pipe and meter casing without interruption. As a result, freezing of water or the like in the meter or in the pipe line connections to the meter is avoided.

In addition to achieving the foregoing objects the housing of this invention is so constructed that it may inexpensively be fabricated from lightweight plastic, and the construction is such that the housing itself is capable of being supported on the meter or the meter and pipeline assembly. Where the pipeline and/or the meter require additional support, the above-mentioned cup-shaped housing part is integrally formed with an elongated, depending boss for receiving a support stake that may be driven in the ground. Thus, a simplified but adequate support is provided for the housing and the meter and pipeline assembly.

Further objects of this invention will appear as the description proceeds in connection with the below described drawings and the appended claims.

DESCRIPTION OF DRAWINGS

FIG. 3 is a longitudinal section taken substantially along lines 3—3 of FIG. 1;

FIG. 5 is a plan view of the window wiper assembly in FIG. 1;

FIG. 6 is a side elevation of the wiper assembly shown in FIG. 5;

FIG. 7 is a perspective view of the sealing lug shown in FIGS. 1 and 2;

FIG. 8 is a partially sectioned, fragmentary side elevation of the tamperproof sealing assembly shown in FIG. 1;

FIG. 9 is a fragmentary section taken substantially along lines 9—9 of FIG. 1; and FIG. 10 is a elevation view of the installation in place.

DETAILED DESCRIPTION

Figure 1:
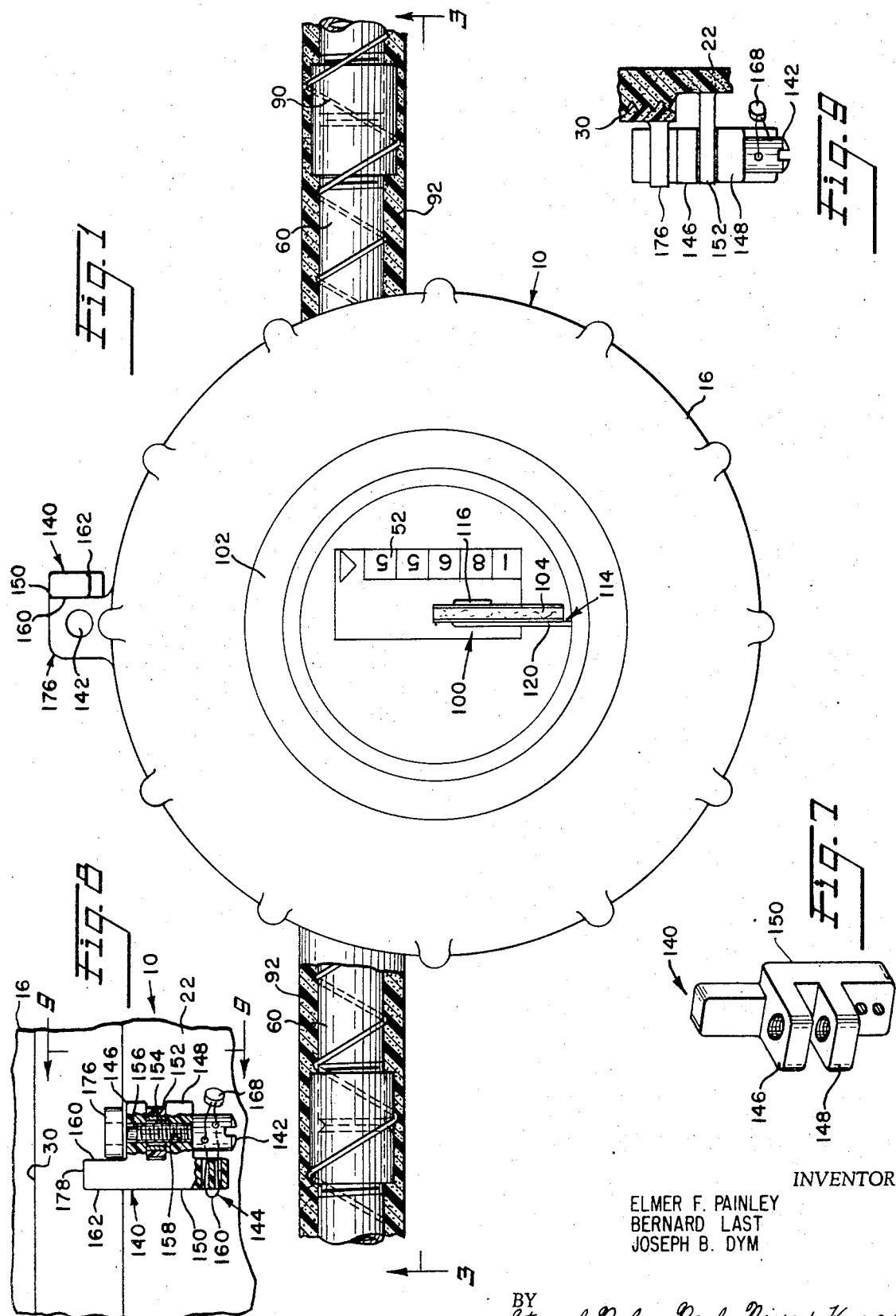
FIG. 1 is a partially sectioned plan view of a meter and housing assembly in which the housing is constructed according to the principles of this invention.
Figure 2:
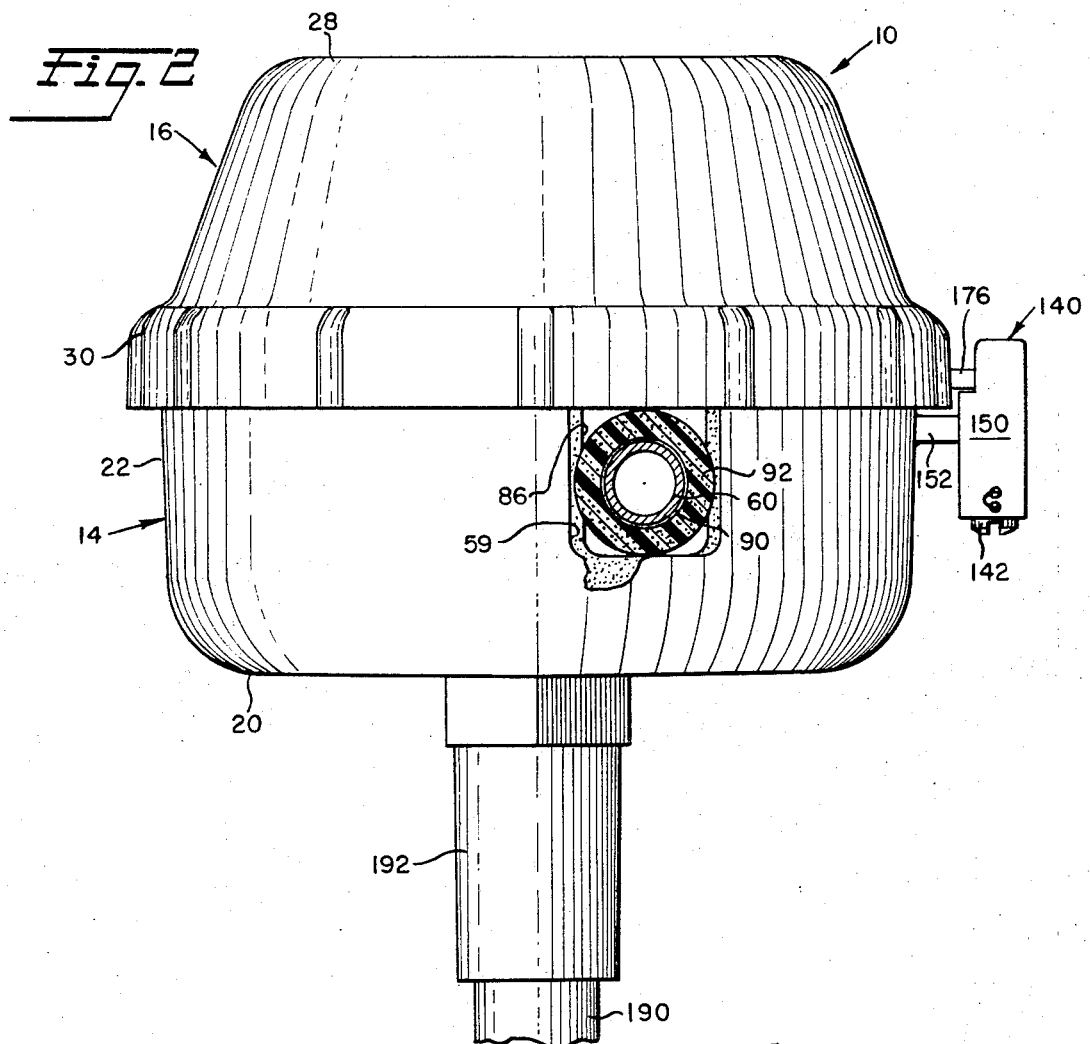
FIG. 2 is a right-hand end view of the assembly as shown in FIG. 1.

Referring now to the drawings and more particularly to FIGS. 1—3, the reference numeral 10 generally designates a housing constructed according to the principles of this invention for receiving a fluid flow meter 12 (FIG. 3). Housing 10 comprises a one-piece essentially cup-shaped body 14 and a transparent, one-piece, screw-on dome-like housing top or cover 16 that cooperates with body 14 to provide an enclosure for meter 12. Body 14 and dome 16 may advantageously be formed from a suitable lightweight relatively rigid, sturdy plastic.

As best shown in FIG. 3, body 14 is integrally formed with a flat bottom wall 20 and an annular skirt portion 22 extending upwardly from wall 20 to define a meter-receiving well. Housing top 16, which covers the open top of body 14, is formed with an annular skirt 26 which depends from a flat top wall 28. Top wall 28 constitutes the meter register-viewing window portion of housing 10.

Still referring to FIG. 3, skirt 26 flares conically outwardly from top wall 28 and terminates at its lower edge in an outwardly offset flange-like portion 30. The inner peripheral surface of portion 30 is formed with threads as indicated at 32. The upper marginal side edge of skirt portion is formed with external, complimentary threads 34 which are engaged by threads 32 when the component parts of housing 10 are in assembled relation. Thus, housing top 16 is detachably threaded onto body 14 to provide a relatively rigid housing assembly.

As shown, top wall 28 and bottom wall 20 are substantially parallel and are spaced apart along the longitudinal axis of housing 10. Portion 30 of dome 16 peripherally and coaxially surrounds the upper threaded end portion of skirt portion 22 in assembled relation. Portions 22 and 30 are formed with uniform diameters as shown. A downwardly facing, annular, internal shoulder 35 formed at the junction between portions 26 and 30 is adapted to seat against the upper edge of skirt portion 22.

Meter 12 is of any suitable, conventional construction and is shown in this embodiment (see FIG. 3) to mainly comprise a meter casing assembly having a meter body 40 and a register mechanism casing 42. Casing 42 seats on top of and is detachably fixed to meter body 40 by a nut 44 or other suitable means. Meter body 40 is formed with a metering chamber 46 in which a bladed, fluid driven metering rotor 48 is rotatably mounted. Rotor 48 is drive connected to a register mechanism 50 by any suitable means (such as a magnetically coupled, driven and driven magnet assembly) to impart rotation of rotor 48 to actuate register mechanism 50.

Still referring to FIG. 3, register mechanism 50 is suitably supported within casing 42 and has a multi-wheel counter 52 that is driven to indicate the volume of fluid that has flowed through metering chamber 46. Casing 42 has a transparent, counter or register-viewing top wall window portion 54 through which the volume indicating numerals on the counter wheels may be observed. As shown, window portion 54 is positioned closely adjacent to and just beneath the transparent top wall 28 of housing top 16 so that the counter registration is readily and conveniently observed through top wall 28 and window 54.

As best shown in FIG. 3, meter body 40 is formed with internally threaded inlet and outlet fluid flow passages 56 and 58 which open at their inner ends into metering chamber 46. In this embodiment, passages 56 and 58 are essentially axially aligned and extend along an axis that is essentially tangential to a circle that is coaxial with the rotational axis of rotor 48. The aligned longitudinal axes of passages 56 and 58 are thus laterally offset from a longitudinal plane medially intersecting meter 12 and housing 10 and containing the rotational axis of rotor 48. The rotational axis of rotor 48 is substantially normal to the direction of fluid flowing through metering chamber 46 and is in alignment with the longitudinal axis of housing 10.

Aligned pipe-connecting nipples 60 are threaded into passages 56 and 58 and respectively extend through spaced notches 59 (see FIGS. 2 and 4) that are formed in the skirt portion 22 of body 14. As best shown in FIG. 2, each of these notches extend down from the upper edge of skirt portion 22. Nipples 60 are coupled by any suitable means to a pipeline 62 that transports the fluid being metered.

Internally, housing 10 is provided with a two piece thermal insulation liner 66 (see FIG. 3). Liner 66 consists of an essentially flat-sided, preformed base 68 and an upper, preformed annular part 70.

Base 68 is an essentially circular solid part that interfittingly and separably seats on bottom wall 20. The annular side surface of base 68 is contoured to closely interfit with skirt portion 22. The top face of base 68 is flat except for a central recess 72 which receives a depending boss portion on meter body 40 so that the otherwise flat bottom of body 40 interfitting and separably seats on the flat top surface of base 68.

With continued reference to FIG. 3, part 70 is formed with an upper portion 80 that is conically flared to interfit with skirt 26 with sufficient clearance so as not to interfere with the rotation of housing top 16 as it is threaded on or off body 14. At the interface between shoulder 35 and the upper edge of skirt portion 22, the upper portion 80 merges with a lower annular portion 82 of essentially uniform diameter. Lower portion 82 slidably fits into the well defined by body 14 and terminates in a flat, annular end face that interfittingly and separably seats on the top face of base 68.

As shown in FIG. 3, liner part 70 is essentially coaxial with the longitudinal axis of housing 10 and peripherally surrounds meter 12. Thus, liner 66 completely and closely surrounds meter 12 except for the open upper end of liner part 70 which aligns with the register-viewing top wall portion of housing top 16.

Figure 4:
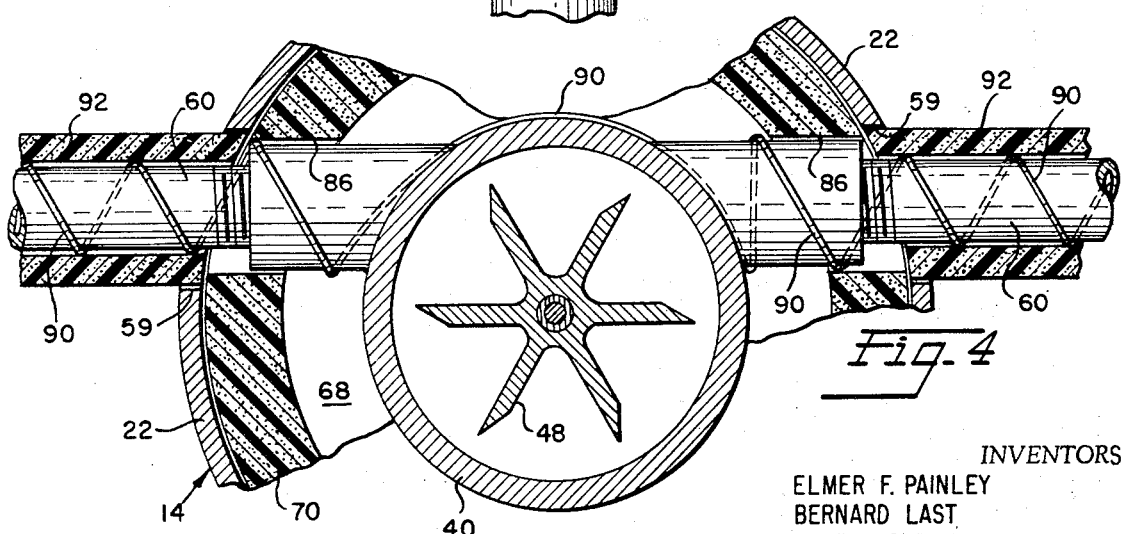
FIG. 4 is a fragmentary section taken substantially along lines 4—4 of FIG. 3.

As shown in FIGS. 2 and 4, the bottom edge of liner part 70 is formed with two spaced apart notches 86 which align with notches 59. Nipples 60 extend through notches 86, and base 68 is of such thickness that the interface between base 68 and liner part 70 is essentially level with the bottom edges of notches 59.

In assembled relation it will be appreciated that meter 12 is not fixed or secured to any part of housing 10 or liner 66. Instead, it is confined against movement of objectionable magnitude by abutting engagement with the interior surfaces of the insulating liner. The parts of liner 66 may advantageously be formed from foamed pieces of polystyrene or other suitable material.

Except for notches 59, the sub-assembly of liner 66 and meter 12 is completely enclosed by housing 10. Notches 59 and 86 are sufficiently large to enable a suitable wrap-around electrical heating cable 90 (see FIG. 4) or other continuous heating element to be extended without interruption along pipeline 62, nipples 60 and meter body 40. The heat generated by passing electrical current through cable 90 is transferred to the pipeline nipples 60 and meter body 40 to heat these parts and the liquid conveyed therethrough, whereby the temperature of the liquid may be maintained at a level that is above its freezing point.

By extending cable 90 along the pipeline and through housing 10 without interruption there are no unheated regions where freezing can develop. The pipeline also is advantageously provided with an insulating cover 92 which is extended over nipples 60 and up to liner part 70 so that no regions are left uninsulated.

As shown in FIGS. 1 and 3, a spring biased wiper assembly 100 is mounted by a rigid ring 102 for wiping the wall 28. As will be described in greater detail shortly, assembly 100 has a wiper pad 104 which is held stationary in engagement with the interior of the register-viewing portion of top wall 28, and housing top 16 is rotated to thereby provide the needed relative motion to wipe the interior surface of the housing top wall clear of any moisture or condensation that may have accumulated on the inner face to impair observation of the meter register reading.

Ring 102 is in the form of an insert and is mounted at the upper open end of liner part 70. As shown in FIG. 3, ring 102 has a uniformly diametered collar portion 106 that is snugly and interfittingly received in the upper end of liner part 70. At the upper end of collar portion 106, ring 102 is formed with an annular, radially outwardly extending lip 108 which overlies and interfittingly seats on the top or upper end face of liner part 70.

Referring now to FIGS. 5 and 6, wiper assembly 100 comprises an enlongated channel-shaped member 112 for receiving a wiper pad 104. Pad 104 is securely clamped between the side walls of member 112 and may be formed from felt or other suitable wiping material.

An elongated wire spring 114 forming a part of wiper assembly 100 provides the support for the assembly of wiper pad 104 and member 112. Spring 114 has a hooked end 116 which extends through aligned holes 118 in the sides of channel member 112. By this construction, the assembly of channel member 112 and pad 104 are secured to the hooked end of spring 114.

Still referring to FIGS. 5 and 6, spring 114 has an intermediate, radially extending portion 120 and an arcuate elongated end portion 122. Intermediate portion 120 extends between and integrally joins the hooked end 116 and portion 122. Spring 114 may be formed from any suitable metal such as, for example brass.

In FIGS. 5 and 6, the normal, unflexed shape which spring 114 assumes when it is disassembled from the other parts of the housing assembly is shown in full lines. The shape of spring 114 when it is assembled with ring 102 in housing 10 is shown in phantom lines in FIGS. 5 and 6.

As shown in FIG. 3, portion 122 of spring 114 is snugly received in ring 102 and is seated on annular radially inwardly extending ledge that forms a part of ring 102. When thusly assembled in ring 102, spring portion 122 will be flexed to assume a substantially circular contour as shown by the phantom lines in FIG. 5. As a result, spring 114 will firmly be held by ring 102.

In assembled relation, the intermediate spring portion 120 will extend essentially radially inwardly from the flexed arcuate end portion 122, and it also will extend upwardly at an incline from the plane containing arcuate end portion 122.

From FIG. 6 it will be seen that in assembled relation with the other parts of the housing assembly, the intermediate portion 120 of spring 114 will be flexed downwardly relative to the arcuate portion 122 as housing top 16 is screwed into position on body 14. As a result, it will assume the position indicated by the phantom lines in FIG. 6.

Thus, when wiper assembly 100 is assembled with the other component parts of the housing assembly, the arcuate end portion 122 of spring 114 will be flexed along the inner periphery of collar portion 106 to thereby locate wiper pad 104 in a desired radial position.

As housing top 16 is screwed onto body 14, wiper pad 104 will be engaged by the interior surface of top wall 28 so that as axial displacement of housing top 16 continues by continuing to thread it onto body 14, the intermediate spring portion 120 will be flexed relative to the plane containing the arcuate portion 122 in the region where portions 120 and 122 are joined together. As a result, wiper pad 104 will be pressed resiliently against the interior face of top wall 28 with a uniformly distributed pressure, and when housing top 16 is fully threaded onto body 14, wiper pad 104 will assume an essentially horizontal position as shown in phantom lines in FIG. 6.

As best shown in FIG. 1, wiper pad 104 is positioned radially of the longitudinal axis of housing 10 in a region where it does not overlie counter 52. To ensure that wiper pad 104 is not positioned where it will impair observation of counter 52, ring 102 is separably seated in the upper end of liner part 70 so that the assembly of ring 102 and wiper assembly 100 may be removed and turned to a position where wiper pad 104 does not overlie the counter.

To prevent ring 102 from turning with housing top 16, ring 102 is integrally formed with a series of circumferentially spaced apart pointed protrusions or spikes 130 (see FIG. 3) which vertically depend from the underside of lip 108 and which are driven into and thereby embedded in the upper end face of liner part 70.

By thusly engaging protrusions 130 in liner part 70, ring 102 and wiper assembly 100 are detachably non-rotatably anchored to the upper end of liner part 70, thereby preventing ring 102 and wiper assembly 100 from being rotated by frictional engagement of top wall 28 with lip portion 108 and/or with wiper pad 104. Ring 102 may be formed from plastic and is more rigid than liner part 70.

As best shown in FIGS. 2, 8 and 9, housing 10 is sealed against unauthorized tampering or access by means comprising a seal lug 140, a seal screw 142, and a conventional, tamperproof wire and lead seal assembly 144. Seal lug 140, as best shown in FIG. 7, is formed with a pair of parallel spaced apart, coextensive arm portions 146 and 148 which are integral with and extend perpendicularly from one side of a flat sided, generally rectangular back portion 150. In assembled relation, a laterally extending, flat sided ear 152 (FIGS. 8 and 9) formed integrally with skirt portion 22 is slidably disposed between arm portions 146 and 148.

Referring to FIG. 8, ear 152 has a smooth walled through bore 154 that is adapted to align with aligned, internally threaded through bores 156 and 158 in arm portions 146 and 148. Ear 152 extends radially outwardly from skirt portion 22, and the axis of bore 154 is parallel to the longitudinal axis of housing 10 and also the rotational axis of housing top 16 which aligns with the longitudinal housing axis.

Seal lug 140 is positioned on ear 152 so that bores 156 and 158 axially align with bore 154, and screw 142, as best shown in FIG. 8, is inserted from the underside of arm portion 148 so that it is first coaxially threaded into bore 148, then passes through bore 154 and is finally threaded into bore 156. In assembled relation, portion 150 of lug 140 is oriented so that the opposite flat side faces 160 and 162 (see FIG. 1) face in circumferentially opposite directions. In this position, each of the side faces 160 and 162 will be positioned in a plane extending parallel to and laterally offset from a plane extending radially of the rotational axis of housing top 16 and containing the aligned axes of bores 154, 156 and 158.

As best shown in FIG. 8, the wire and lead seal assembly conventionally comprises a sealing wire 166 and a metal seal 168 which is usually made of lead. The two ends of wire 166 are first threaded through parallel spaced apart through bores in a depending section of lug portion 150 and then through parallel spaced apart through bores in the head of screw 142. The ends of wire 166 are usually twisted together and embedded in the lead seal 168 so that a closed tamperproof loop is provided and passes first through one bore in the head of screw 142, next through one bore in portion 150 then through the other bore in portion 150 and finally through the other bore in the head of screw 142.

The loop defined by the wire and lead seal assembly 144 is small enough to prevent screw 142 from being threaded out of bore 156. Screw 142 therefore cannot be removed without destroying one or more parts of the wire and lead seal assembly 144. As a result, sealing lug 140 cannot be removed from ear 152 without destroying the wire and lead sealing assembly 144 or other part or parts of the housing assembly such as ear 152 or lug 140 itself.

To interlock housing top 16 with body 14 and yet permit limited relative rotation of housing top 16 for wiping the interior face of top wall 28, an inter-locking ear 176 is formed integral with housing top 16 and extends radially outwardly from portion 30 so that it rotates in a circumferential path extending peripherally around portion 30 as housing top 16 is threaded on and off body 14. The sealing lug portion 150, which bridges arm portions 146 and 148, has a stop or end portion 178 (see FIG. 8) which extends upwardly beyond arm portion 146 and into the circumferential path in which ear 176 is rotated. Arm portion 146 is disposed below and thus out of the path in which ear 176 is rotated.

Thus, when seal lug 140 is mounted on ear 152 in the previously described manner, housing top 16 can only be rotated in either direction through a maximum angle that is slightly less than 360° and appreciably insufficient to effect detachment from body 14 owing to the number of threads that are formed in portions 22 and 30. Rotation of housing top 16 in one direction will be limited by abutment of ear 176 with face 160, and rotation of housing top 16 in the opposite direction will be limited by abutment of ear 176 with face 162.

Thus housing top 16 cannot be detached from body 14 without first destroying the wire and seal assembly 144 and/or some other part or parts of the housing assembly. As a result housing 10 is made tamperproof in the sense that one or more parts of the above-described housing assembly must first be unconcealably destroyed in order to gain access to the interior of housing 10 and the meter therein.

At the same time, the sealed interlock provided by seal lug 140, seal screw 142, wire and seal assembly 144 and ear 176 permits the screwed-on housing top 16 to be rotated through a limited angle of slightly less than 360 degrees to wipe the interior register-viewing portion of top wall 28 against the stationary wiper 104.

Thus, condensation or moisture accumulating on the interior face of top wall 28 and impairing observation of the housed meter register may be wiped off simply by turning housing top 16 through a limited angle and without detaching housing top 16 from body 14 or destroying the wire and seal assembly 144 or any other part of the housing assembly.

Preferably, ears 152 and 176 are so relatively positioned that when housing top 16 is tightly threaded onto body 14 substantially to the limit of its threaded engagement with body 14, ear 176 will overlie arm portion 146 closely adjacent to surface 160. Thus, housing top 16 will tightly be threaded onto body 14 to preclude entry of dust, foreign particles or other matter, while at the same time providing a maximum angle of housing top rotation to wipe the interior face of top wall 28 clean.

In assembling housing top 16 on body 14, the housing top is first threaded tightly onto body 14 to its position where ear 176 overlies and closely aligns with ear 152. Sealing lug 140 is then positioned on ear 152 in the previously described manner, and screw 142 then is inserted and screwed into bores 156 and 158 as previously described. Finally wire 166 is threaded through the bores in sealing lug portion 150 and the head of screw 142 in the previously described manner, and ends of wire 166, after being twisted together, are embedded in the lead seal 168.

Assembly of meter 12 and liner 66 in housing 10 is relatively quick and simple, mainly owing to the fact that no fastening elements are utilized for this purpose. With housing top 16 removed, base 68 is first inserted into body 14 and separably seated on bottom wall 20. Then the sub-assembly of meter 12 and nipples 60 (or the meter alone) is inserted into the well defined by body 14 to separably and centrally seat on base 68 with nipples extending through notches 59. Next, the annular liner part 70 is inserted over meter 12 with the notches 86 being fitted over nipples 60.

The sub-assembly of ring 102 and wiper assembly 100 may be pre-assembled on liner part 70 or it may be mounted on liner part 70 after it is fitted over meter 12. If wiper 104 overlies counter 52 to impair observation of the meter register reading, ring 102 may be detached from liner part 70 simply by lifting it. The ring then may be turned to angularly offset wiper 104 and pressed down firmly into the upper end of liner part 70 in its new position. Finally, housing top 16 is screwed onto body 14 after which the tamperproof seal is assembled all as previously described. The housing and meter assembly is now ready for connection to pipeline 62.

It will be appreciated that housing 10 may also be assembled around a meter already installed in a pipeline and without disconnecting the meter from the pipeline. Furthermore, by virtue of the unique and lightweight construction of housing 10, the housing is capable of being supported on the assembly of nipples 60 (which form a part of the pipeline) and meter 12, in contrast to supporting meter 12 or the meter and pipeline assembly on housing body 14. Where additional support is needed, housing 10 may be supported on a stake 190 or the like having a lower shape end which is driven into the ground (see FIG. 10). The upper end of stake 190 is coaxially and interfittingly received in a straight, elongated, smooth-walled, hollow boss portion 192 which is formed integral with body 14 and which centrally depends from bottom wall 20 along an axis aligning with the longitudinal axis of housing 10.

Although housing 10 is particularly suited for enclosing water meters, it will be appreciated that it may be utilized to house any type of fluid meter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A structure for housing a fluid flow meter having a register unit, said structure comprising a hollow body for receiving said meter, a housing top rotatably mounted on said body and being detachable from said body upon predetermined rotation relative to said body, said housing top cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, and means permitting limited relative rotation of said housing top and said body to wipe said interior face with said wiper means but preventing sufficient relative rotation of said housing top and said body for detaching said housing top from said body.

2. The structure defined in claim 1 wherein said housing top and said body are formed with cooperating threaded portions to thread said housing top onto said body and to provide for the relative rotation of said housing top and said body.

3. A structure for housing a fluid flow meter having a register unit, said structure comprising a hollow body for receiving said meter, a housing top rotatably detachably mounted on said body and cooperating with said body to define an enclosure for said meter, a transparent register unit-viewing window portion forming a part of said housing top for observing the reading on the meter register unit within said enclosure, a thermal insulation liner disposed around said meter in said enclosure, window wiper means, and means mounting said wiper means on said liner to engage the interior face of said window portion for wiping said interior face upon rotation of said housing top relative to said body.

4. The structure defined in claim 3 wherein said liner comprises a preformed annular part peripherally surrounding said meter and having an open end adjacent to said window portion, said wiper means being supported by said mounting means on said end adjacent to said window portion, and said annular part being sufficiently rigid to provide a firm support for said wiper means and said mounting means.

5. The structure defined in claim 4 wherein said mounting means comprises an annular member seated on said end of said annular part adjacent to said window portion, and means supporting said wiper means on said annular part.

6. The structure defined in claim 5 wherein said annular member is removably seated on said end of said annular part and has protrusions driven into said end of said annular member to retain said wiper means stationary relative to said annular part against the friction produced by engagement of said wiper means with said window portion and tending to cause said wiper means to rotate with said housing top.

7. The structure defined in claim 6 wherein said housing top is threaded onto said body, whereby said housing top is axially displaced upon rotation relative to said body and wherein said means supporting said wiper means on said annular member comprises a spring element biasing said wiper means into engagement with said interior face.

8. The structure defined in claim 4 wherein said liner further comprises a preformed base part formed separately of said annular part and being seated in the bottom of said body, said annular part and said meter being separably seated on said base part.

9. A structure for housing a fluid flow meter having a register unit, said structure comprising a hollow body for receiving said meter, a housing top rotatably, detachably mounted on said body and cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, retention means providing for sufficient rotation of said housing top relative to said body to wipe said interior face with said wiper means while releasibly preventing detachment of said housing top from said body, and tamperproof means comprising a wire and seal lock and cooperating with said retention means for preventing undetectable detachment of said housing top from said body.

10. A structure for housing a fluid flow meter having a register unit, said structure comprising a hollow body for receiving said meter, a housing top rotatably, detachably mounted on said body and cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, means providing for sufficient rotation of said housing top relative to said body to wipe said interior face with said wiper means while preventing detachment of said housing top from said body, said last-mentioned means comprising first and second portions respectively formed integrally with said body and said housing top, and a stop abutment part detachably mounted on one of said portions and being abuttable with the other of said portions to limit relative rotation between said body and said housing top to a predetermined angle, and means requiring destruction to provide for the detachment of said stop abutment part from said one portion.

11. The structure defined in claim 10 wherein said housing top is threaded onto said body and wherein said predetermined angle of relative rotation motion between said body and said housing top is insufficient to threadedly detach said housing top from said body when said housing top is threadedly engaged with said body by a predetermined magnitude.

12. The structure defined in claim 11 wherein said means providing for sufficient rotation of said housing top relative to said body to wipe said interior face with said wiper means while preventing detachment of said housing top from said body further comprises a member removably secured to said one portion for detachably mounting said stop abutment part thereon, and wherein said means requiring destruction comprises a wire and metal seal assembly defining a closed loop passing through said stop abutment part and member and being destructible to provide for the removal of said member from said portion.

13. A structure for housing a fluid flow meter having a register unit, said structure comprising a hollow body for receiving said meter, a housing top rotatably mounted on said body and being detachable from said body upon predetermined rotation relative to said body, said housing top cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, and retention means releasibly preventing sufficient rotation of said housing top relative to said body for detaching said housing top from said body but permitting limited rotation of said housing top relative to said body to wipe said interior face with said wiper means, and means cooperating with said retention means for preventing said housing top from being undetectably detached from said body.

14. The structure defined in claim 13 wherein said retention means comprises coacting stop abutment parts carried by said housing top and said body for limiting rotation of said housing top relative to said body to a predetermined angle.

15. The structure defined in claim 13 wherein said retention means comprises first and second parts respectively carried by said housing top and said body and being abuttable with each other upon relative rotation of said housing top and said body to limit rotation of said housing top relative to said body to a predetermined angle, said first and second parts being relatively displaceable to permit relative rotation of said housing top and said body beyond said predetermined angle for enabling said housing top to be detached from said body, said means cooperating said retention means including a part that requires destruction to effect the relative displacement of said first and second parts that permits relative rotation of said housing top and said body beyond said predetermined angle.

16. The structure defined in claim 13 wherein said body is of cup-shaped configuration having a peripheral skirt portion extending upwardly from a base portion to define an open end for receiving said meter, and wherein said housing top is of generally dome-shaped configuration and is secured to said skirt portion to cover said open top.

17. A structure for housing a fluid flow meter having a register unit, said structure comprising a hollow body for receiving said meter, a housing top rotatably mounted on said body and being detachable from said body upon predetermined rotation relative to said body, said housing top cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, first and second parts respectively carried by said housing top and said body and being abuttable upon relative rotation of said housing top and said body for preventing sufficient relative rotation of said housing top and said body to detach said housing top from said body, but permitting enough relative rotation of said housing top and said body to wipe said interior face with said wiper means, one of first and second parts being displaceable relative to the other of said first and second parts to enable said housing top and said body to be relatively rotated sufficiently for detaching said housing top from said body, and tamperproof means cooperating with said one of said parts for preventing sufficient undetectable displacement of said one part relative to said other part that permits said housing top and said body to be relatively rotated sufficiently far to effect the detachment of said housing top from said body.

18. The structure defined in claim 17 wherein said tamperproof means comprises a wire and seal lock.

19. A structure for housing a fluid flow meter having a register unit, said structure comprising a hollow body for receiving said meter, a housing top rotatably mounted on said body and being detachable from said body upon predetermined rotation relative to said body, said housing top cooperating with said body to define an enclosure for said meter, a transparent register unit-viewing window portion forming a part of said housing top for observing the meter reading on the register unit within said enclosure, window wiper means supported relatively stationary with respect to said body and engaging the interior face of said window portion for wiping said interior face upon rotation of said housing top relative to said body, and means permitting limited rotation of said housing top relative to said body to wipe said interior face with said wiper means but preventing sufficient undetectable rotation of said housing top relative to said body for detaching said housing top from said body.

* * * * *